Sept. 8, 1953 K. R. DAVIES ET AL 2,651,517
HYDRAULIC GOVERNOR FOR GAS TURBINE ENGINE FUEL SYSTEMS
Filed May 11, 1948 2 Sheets-Sheet 1
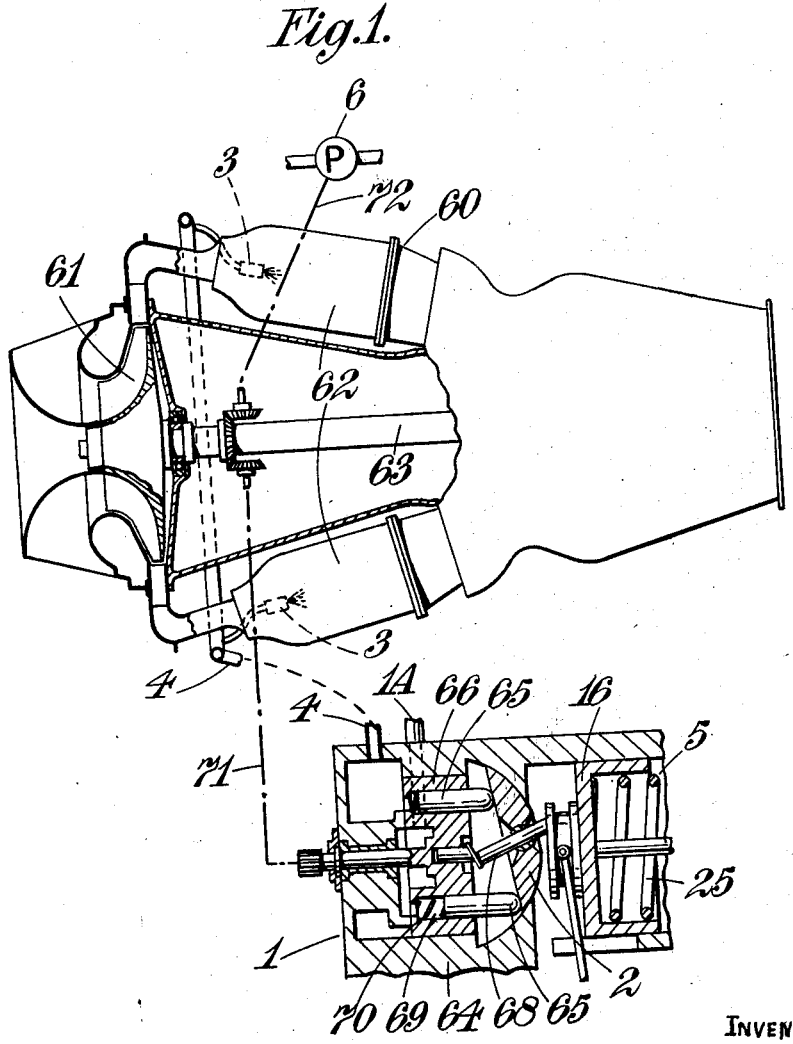
INVENTORS
K. R. DAVIES +
K. HERBSTRITT
By
Wilkinson + Mawhinney
ATTYS

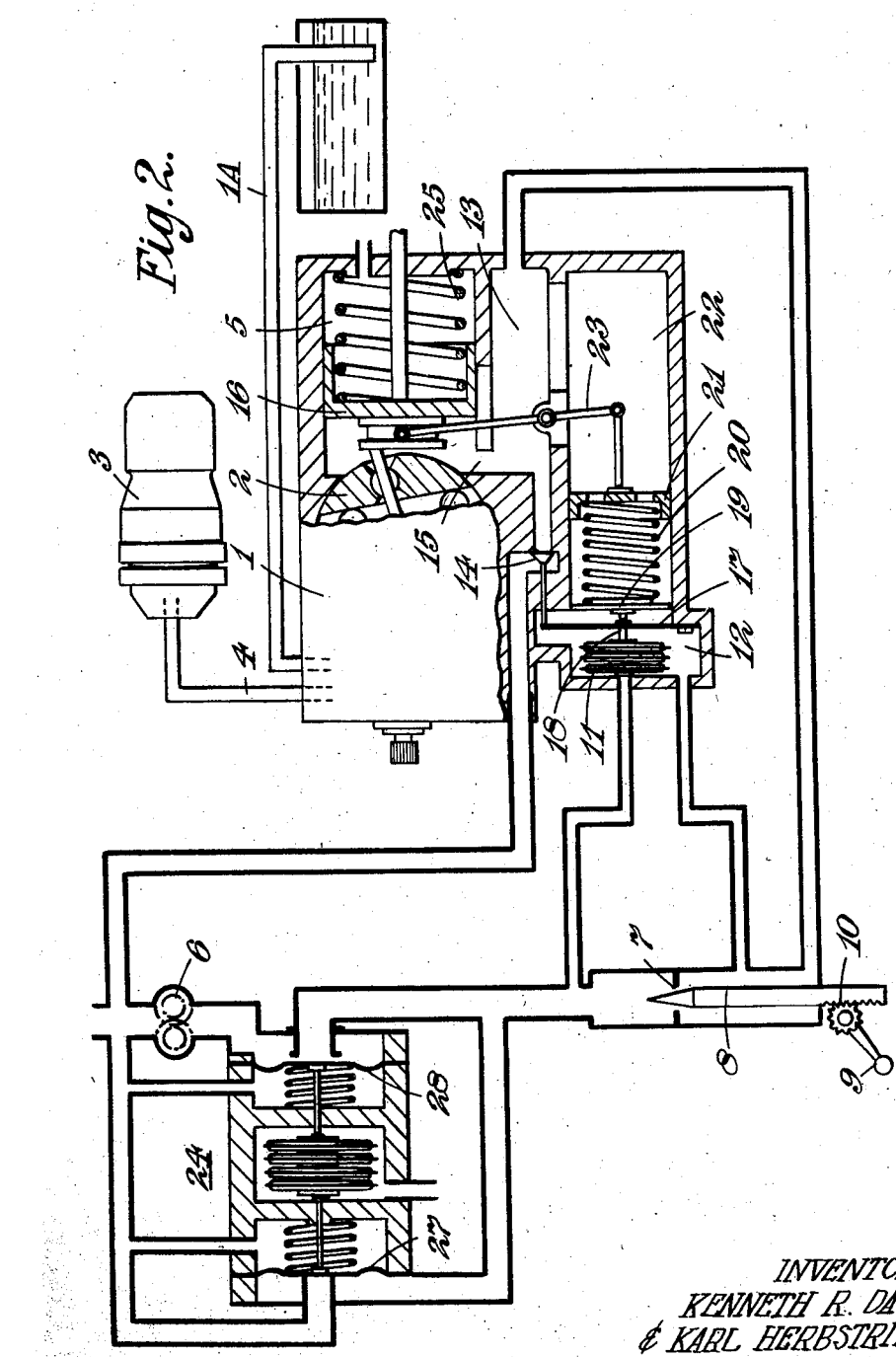

Patented Sept. 8, 1953

2,651,517

UNITED STATES PATENT OFFICE 2,651,517

HYDRAULIC GOVERNOR FOR GAS TURBINE ENGINE FUEL SYSTEMS

Kenneth Roy Davies, Radbourne, near Derby, and Karl Herbstritt, Littleover, Derby, England, assignors to Rolls-Royce Limited, Derby, England, a British company Application May 11, 1948, Serial No. 26,426
In Great Britain May 12, 1947

11 Claims. (Cl. 264—7)

This invention relates to gas-turbine-engine fuel systems, and relates to fuel systems, hereafter referred to as fuel systems of the kind specified comprising governing means including a fixed capacity hydraulic pump driven at a speed proportional to engine speed and passing liquid through restricting means varied by an engine speed selecting device, and means responsive to the pressure drop across said variable restricting means and operative to vary the fuel-delivery of a fuel-pump to the engine to maintain the selected speed.

In a fuel system of this kind for any given setting of the variable restricting means there is a range of speed (referred to hereafter as the "run-up" range), required to vary the fuel-delivery from a maximum to a minimum, so that in effect each engine-speed within the run-up range for a given setting of the variable restricting means corresponds to a fuel-delivery between the maximum and the minimum.

The ability of the governing means to maintain a selected engine speed as determined by a setting of the variable restricting means is affected by the rapidity with which the governing means operates to vary the fuel delivery to the engine to bring the engine speed back to the selected speed after an undesired change of engine speed from the selected speed has occurred, and the rapidity with which the governing means operates is determined by the run-up range and the governing force, that is to say, the force available to actuate a fuel pump control for varying the fuel-pump delivery.

The present invention has for one object to provide an improved governing means in which the ability to maintain a selected speed is attained without excessive run-up range.

It is another object of this invention to provide for use with a variable volume fuel pump in a fuel system for a gas-turbine engine and the like, a control system for controlling delivery of the fuel from the fuel pump to the engine comprising a fluid motor (for instance a piston and cylinder device) adapted to be connected to said fuel pump for varying the volume of fuel delivered therefrom, a servo fluid control system for actuating said fluid motor, a variable restricted orifice in said servo fluid control system, valve means in said system for controlling the degree of operating movement of said fluid motor, pressure sensitive means subject to the pressure drop across said variable restricted orifice and yieldably biased to close said valve means, and a valve-opening adjustable load device acting in opposition to said pressure sensitive means connected to said fluid motor for adjustment of its load proportional to the displacement of the movable element of the fluid motor. In this way the maximum pressure increase operating on the piston and cylinder device may be defined as a ratio between the effective area of the means responsive to pressure drop and the area of the valve means upon which the said pressure acts.

It will be apparent that the run-up range of the system depends in part on the rate of resilient means loaded proportionally with the movement in the piston and cylinder device and that the increase of governor force available through use of the servo system enables the magnitude of the run-up range to be reduced, whilst the ability of the governing means to maintain a selected speed is retained.

It will be appreciated that since the connection to the cylinder of the piston and cylinder device is downstream of the variable restricting means, movement of the piston in the cylinder device will not affect the flow of liquid delivered by the hydraulic pump through the variable restricting means.

One arrangement of fuel system for a gas-turbine engine will now be described by way of example of this invention, reference being made to the accompanying drawings, in which Figure 1 illustrates a typical gas-turbine engine and variable delivery fuel pump for delivering fuel to the engine, and Figure 2 illustrates diagrammatically the fuel system and governing means therefor.

Referring now to Figure 1, there is illustrated an aircraft gas-turbine engine of the jet propulsion kind and a typical variable delivery fuel pump 1 for delivering fuel to the engine.

The gas-turbine 60 comprises a compressor 61 which delivers compressed air into a series of combustion chambers 62 which are disposed in a ring around the engine and of which two only are shown, a fuel delivery manifold connected with fuel injection devices 3 for delivering fuel into the combustion chamber 62 wherein the fuel is burnt, a turbine (not shown) which receives the combustion products from the combustion chambers 62 and drives a shaft 63 carrying the compressor rotor.

The fuel is delivered to the fuel-injection devices 3 by the variable-capacity fuel pump 1 through a delivery pipe 4, the pump being driven from the shaft 63 through a drive indicated at 71.

The fuel pump 10 as illustrated comprises a body 64, a rotor 66 accommodated within the pump body 64, a plurality of plungers 65 which reciprocate in bore 69 in the rotor 66 against the action of springs 70 and means to adjust the stroke of the pump plungers 65 to vary the delivery of the pump. The means to vary the delivery of the pump in the construction of pump illustrated comprises a swash plate 2 carried on the cranked portion of a spindle 68 which is axially movable with respect to the pump rotor 66. As the spindle 68 is adjusted axially of the rotor 66, the inclination of the cam face of the swash plate 2 with respect to the rotor axis varies thus altering the stroke of the pump plungers 65. In operation, on rotation of the rotor through the drive 71 fuel is drawn into the pump bores through the suction pipe 1a by the pump plungers 65 riding up the cam face of swash plate 2 under control of spring 70 and subsequently the fuel is delivered into the delivery pipe 4 by the plungers 65 riding down the cam face of swash plate 2 against the action of the spring 70.

The axial movement of the spindle 68 is effected by means of a piston 16 forming part of a piston and cylinder device 5 and the position of the piston 16 in its cylinder is controlled by governing means now about to be described.

The governing means for controlling the pump capacity in this embodiment comprises an hydraulic system, which is independent of the fuel system, although conveniently fuel may be used as the hydraulic medium. The system comprises a gear or like pump 6 of substantially constant capacity arranged to be driven at a speed proportional to the rotational speed of the engine through a drive indicated at 72 in Figure 1. In certain cases, this pump 6 can be used as a booster pump for the main fuel pump, fuel handled by the hydraulic pump in excess of the requirements of the engine being by-passed and returning to the supply reservoir.

The gear pump 6 delivers liquid at a rate which is proportional to engine rotational speed, through a variable restriction (Figure 2) in the form of an orifice 7 controlled by a needle valve 8 which is moved by the engine control lever 9 through a rack and pinion 10. The pressure drop across the orifice operates on pressure sensitive means afforded in the illustrated construction by an expansible capsule 11, which is accommodated in a chamber 12, the arrangement being that the capsule is internally subjected to the pressure upstream of the orifice 7 and externally subjected to the pressure downstream thereof.

After passing through the orifice 7 the liquid enters a chamber 13 the outflow from which is controlled by a poppet valve 14 and then returns to the suction side of the pump 6. The chamber 13 communicates through a port 15 with one side of the piston 16 of the piston and cylinder device 5, the other side of the piston being loaded by a spring 25.

It is arranged that the poppet valve 14 is loaded by the capsule 11 in the sense of closure on increase of pressure drop across the orifice 7. It is also arranged that the poppet valve 14 is loaded in the sense of opening by a spring load, which is proportional to the position of the piston 16. Further the pressure downstream of the orifice 7 operates on an effective area of the poppet valve tending to open the latter.

In the arrangement illustrated in Figure 2 the poppet valve is carried at the free end of a leaf spring 17 which is connected intermediate its length to a push rod 18 interposed between the capsule 11 and a movable abutment 19 for a spring 20. The other abutment for the spring 20 is in the form of a piston 21 working in a chamber 22 which is open to chamber 13. The piston 21 is displaced by a pivoted lever 23 which is rocked by movements of the piston 16, whereby the spring 20 is compressed and the poppet valve is loaded by an amount which is dependent on the position of piston 16 and thus on changes of pressure upstream of the poppet valve.

The arrangement illustrated also includes means 24 as described and claimed in our co-pending United States application Serial No. 26,424 filed May 11, 1948, now Patent No. 2,618,222 of November 18, 1952, for limiting the maximum and minimum delivery pressures of the pump 6. Thus valve 27 ensures that the pressure upstream of the orifice 7 has a definite minimum value whilst the valve 28 operates to limit the maximum pressure upstream of the orifice 7. By suitably selecting the pressures at which these valves open the maximum and minimum strokes of the pump 1 can be determined.

The operation of the above described arrangement is as follows: An increase in pressure drop across the orifice 7, for example arising from an undesired increase of engine speed, has the effect initially of closing the poppet valve 14, and of increasing the pressure operative on the piston 16 displacing the latter to reduce the pump stroke. The maximum pressure increase in chamber 13 thus caused is limited by the ratio of the effective areas of the poppet valve 14 and the capsule 11, and if the effective area $A_1$ of the poppet valve 14 is less than the effective area $A_2$ of the capsule, the maximum pressure increase in chamber 13 will be substantially equal to the change in the pressure drop across the orifice 7 multiplied by $$\frac{A_2 L_2}{A_1 L_1}$$

where $L_1$ is the total length of the leaf spring 17 and $L_2$ is the length between the fulcrum of the leaf spring and the point of connection between the leaf spring and the push rod 18, the loading of the spring 20 not being substantially altered until the piston 16 moves. In other words the governing force is increased permitting a more rapid decrease in the fuel supply on occurrence of an unwanted increase in speed.

Movement of the piston under the influence of such increase of pressure results in increased loading of the poppet valve 14, tending to open the poppet valve, thereby to reset the fuel-pump to stabilize the engine speed.

A similar operation occurs on occurrence of an unwanted fall of engine speed, except that in this case the capsule opens the valve 14 reducing the pressure applied to piston 16 which then moves to increase the fuel delivery and to reset the valve 14 by decreasing the load on it due to the spring 20.

It will be seen that with this arrangement, in addition to the governing force avialable being greater, the run-up range for a given setting of the variable restricting means is less than that which would be necessary to change the stroke of the fuel-pump between a maximum and a minimum if the pressure drop across the variable restricting means were applied directly to the piston and cylinder device. The governing means thus has an increased ability to maintain a selected engine speed.

We claim:

1. For use with a variable volume fuel pump in a fuel system for gas-turbine engines and the like, a control system for controlling the delivery of the fuel from the fuel pump to the engine comprising a fluid motor adapted to be connected to said fuel pump for varying the volume of fuel delivered therefrom, a servo fluid control system for actuating said fluid motor, a variable restricted orifice in said servo fluid control system, valve means in said system for controlling the degree of operating movement of said fluid motor, pressure sensitive means subject to the pressure drop across said variable restricted orifice and yieldably biased to close said valve means, and a valve-opening adjustable load device acting in opposition to said pressure sensitive means connected to said fluid motor for adjustment of its load proportional to the displacement of the movable element of the fluid motor.

2. A control device for adjusting the volumetric output of a variable capacity fuel pump in the fuel systems of gas-turbine engines and the like comprising a fluid motor adapted to be connected to said pump to vary the output thereof, a supply line of servo liquid under pressure to said motor, a valve controlling the exhaust of servo fluid from the motor, pressure responsive means for placing a first load on said valve tending to close the same, a variable restricted orifice in said line creating a pressure drop across said pressure responsive means, a second load device on said valve tending to open the same, and a connection between said motor and second load device for varying the value of said second load in proportion to the movement of said motor.

3. In a hydraulic governor mechanism, a fixed-capacity hydraulic pump adapted to be driven at a speed proportional to the variable to be controlled; a delivery conduit connected to the outlet from said hydraulic pump; variable flow-restricting means in said delivery conduit; a piston connected to be displaced in accordance with the pressure within said delivery conduit on the downstream side of said variable flow-restricing means; an outflow valve arranged to control the outflow of fluid from said delivery conduit at a point therein downstream of the point of connection thereto of said piston, said valve being arranged to be loaded in the sense of opening in accordance with the position of said piston, the opening load increasing with the pressure to which said piston is subjected; pressure-sensitive means connected to be sensitive to the difference in fluid pressures in said delivery conduit on each side of said variable flow-restricting means and arranged to load said valve in a sense of closure, the closure load increasing with increase of said difference in fluid pressures; said piston being connected to effect a change of the variable to be controlled in a manner opposite to an unwanted change of said variable.

4. A hydraulic speed governor mechanism comprising a fixed-capacity hydraulic pump adapted to be driven at a speed proportional to the speed which is to be controlled; a delivery conduit connected to the outlet from said hydraulic pump; variable flow-restricting means in said delivery conduit; a piston and cylinder device having the cylinder space on one side of the piston connected to said delivery conduit on the downstream side of said variable flow-restricting means; an outflow valve controlling outflow of fluid from the cyinder space on said side of the piston connected to said delivery conduit; means interconnecting said outflow valve and said piston to load said outflow valve in the sense of opening in accordance with the displacement of said piston in said cylinder, the opening load increasing with increase of the pressure within the cylinder space on the side of the piston connected with the delivery conduit; hydraulic pressure-sensitive means connected to be sensitive to the difference in fluid pressures within said delivery conduit on each side of said variable flow-restricting means and connected to load said outflow valve in the sense of closure with a load which increases with increase of said difference in fluid pressures; and means to vary the speed which is to be controlled and connected with the piston to be adjusted thereby to vary said speed in a manner opposite to any unwanted change of said speed.

5. A hydraulic speed governor mechanism as claimed in claim 4, wherein said variable flow restricting means comprises an orifice in said delivery conduit, a valve member arranged to co-operate with said orifice and adjustable with respect to the orifice to vary its effective area, and manual means to adjust said valve member with respect to the orifice.

6. A hydraulic speed governor mechanism as claimed in claim 4, wherein said means interconnecting said piston and said poppet valve comprises a spring arranged to have one abutment on the valve and having a second abutment afforded by a part arranged for displacement in accordance with displacements of said piston.

7. A hydraulic speed governor mechanism as claimed in claim 6, wherein said outflow valve comprises a poppet valve element and a leaf spring carrying at its end said poppet valve element and wherein said spring having an abutment which is displaced in accordance with movements of said piston is arranged to bear against said leaf spring intermediate its ends.

8. A hydraulic speed governor mechanism as claimed in claim 7, wherein said pressure-sensitive means comprises an expansible capsule connected to be subjected on opposite sides to the fluid pressures within the delivery conduit upstream and downstream of said variable-area flow-restricting means and connected to load said leaf spring at a point intermediate its ends.

9. A speed governor system comprising a fixed-capacity hydraulic pump adapted to be driven at a speed proportional to a speed which is to be governed; a delivery conduit connected to the outlet from said hydraulic pump; flow restrictor means in said delivery conduit; selector means co-operating with said flow restrictor means to select the effective and adjustable area of said flow restrictor means; a pressure chamber; a fluid connection to said chamber from a point in said delivery conduit downstream of said flow restrictor means; a piston arranged to be moved in one sense in accordance with the pressure in said pressure chamber; resilient means loading said piston to move in the opposite sense; an outflow conduit from said pressure chamber; a valve controlling the flow through said outflow conduit; means connecting said valve and said piston to load said valve in opening sense, the opening load increasing with increase of pressure in said pressure chamber; hydraulic pressure-sensitive means connected to be sensitive to the difference in fluid pressures in said delivery conduit on each side of said flow restrictor means and connected to load said valve in the sense of closure, the closure load increasing with increase of said difference in fluid pressures; and means adapted to cause variations of the speed which is to be governed, and connected to be adjusted by said piston to vary said speed in a manner opposite to an unwanted change of speed.

10. A hydraulic speed governor mechanism comprising a piston and cylinder servo device, and control means for said piston and cylinder device comprising a fixed-capacity hydraulic governor pump arranged to be driven at a speed proportional to the speed which is to be controlled; a delivery conduit from said hydraulic governor pump; a flow restrictor in said delivery conduit; a member co-operating with said flow restrictor and adjustable to vary the effective area of the flow restrictor and acting as an engine speed selector device; a hydraulic connection from said delivery conduit downstream of said flow restrictor to one end of the piston and cylinder device to load the piston and cylinder device; a lift valve in said delivery conduit downstream of said connection controlling the flow from the delivery conduit to a return conduit connected with the suction side of the hydraulic governor pump, said lift valve being loaded in the sense of opening by the pressure acting in said piston and cylinder device; a pressure-sensitive device connected with said delivery conduit to be subjected to the pressure drop across the flow restrictor, said pressure-sensitive device being connected with said lift valve to load it in the sense of closure by an amount determined by the pressure drop across the flow restrictor; a spring loading the lift valve in the sense of opening; a movable abutment for said spring, said movable abutment being connected with the piston and cylinder device to be moved thereby to increase the load applied to the lift valve by the spring on movement of the piston and cylinder device following an increase in the servo-pressure acting on the piston and cylinder device and to decrease the load applied by the spring to the lift valve following movement of the piston and cylinder device due to a decrease in the servo-pressure acting on the piston and cylinder device.

11. A hydraulic speed governor mechanism as claimed in claim 10, comprising also a leaf spring element fixed at one end and carrying the lift valve at its opposite end and means connecting the pressure-sensitive device and the spring which loads the lift valve in accordance with movements of the piston and cylinder device, with the leaf spring between its ends.

KENNETH ROY DAVIES.
KARL HERBSTRITT.

References Cited in the file of this patent

UNITED STATES PATENTS

| Number | Name | Date |
|---|---|---|
| 1,814,631 | Ray | July 14, 1931 |
| 2,219,994 | Jung | Oct. 29, 1940 |
| 2,538,605 | Udale | Jan. 16, 1951 |
| 2,538,606 | Udale | Jan. 16, 1951 |
| 2,618,222 | Davies et al. | Nov. 18, 1952 |
| 2,621,632 | Ifield | Dec. 16, 1952 |
| 2,621,913 | Ifield | Dec. 16, 1952 |

FOREIGN PATENTS

| Number | Country | Date |
|---|---|---|
| 493,174 | Great Britain | Oct. 4, 1938 |
| 595,152 | Great Britain | Nov. 27, 1947 |
| 620,197 | Great Britain | Mar. 21, 1949 |